Aug. 30, 1949.  F. O. CHESUS ET AL  2,480,117
DIRECTION FINDER

Filed June 27, 1945  2 Sheets-Sheet 1

INVENTORS
FRANK O. CHESUS
FRANK G. THOMAS
BY Percy P. Lantry
ATTORNEY

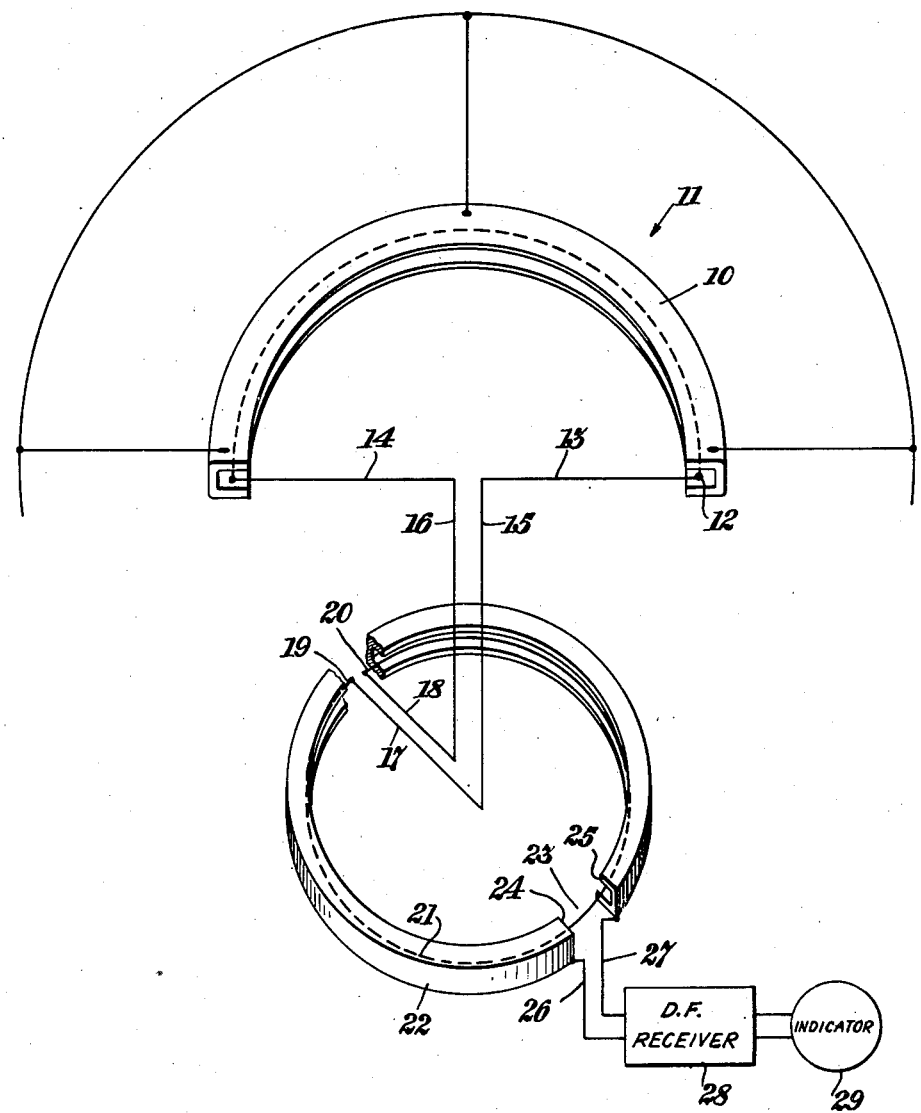

Patented Aug. 30, 1949

2,480,117

UNITED STATES PATENT OFFICE 2,480,117

DIRECTION FINDER

Frank O. Chesus, Jackson Heights, and Frank G. Thomas, Islip, N. Y., assignors to Federal Telephone and Radio Corporation, New York, N. Y., a corporation of Delaware Application June 27, 1945, Serial No. 601,801

19 Claims. (Cl. 343—113)

The present invention relates to direction finding antenna systems for horizontally polarized waves.

An object of the present invention is the provision of a simple and compact directive antenna system, particularly one suitable for direction finding reception of horizontally polarized waves.

Another object of the present invention is the provision of an antenna system of the type hereinabove described which is adapted for satisfactory operation over a relatively broad band of frequencies, particularly the higher frequencies.

Still another object of the present invention is the provision of an improved antenna system, particularly suitable for direction finding reception of horizontally polarized waves, and characterized in one embodiment by relatively sharp discrimination against downwardly-directed waves.

Another object of the present invention is the provision of a simple and compact direction finder collector system in which a goniometer is mounted within the antenna.

In accordance with one aspect of our invention, a simple closed loop is used as the antenna and provides multi-lobed directive patterns—in one embodiment, closed figure-of-eight. This is accomplished by connecting spaced points on said loop separately to the load. According to another aspect of our invention, this load is a goniometer mounted in the geometrical center of the loop and forming therewith a convenient and compact structure.

Other and further objects of the present invention will become apparent and the invention will be best understood from the following description of embodiments thereof, reference being had to the drawings, in which:

Fig. 3 is a schematic perspective view of the goniometer employed in the embodiment of Fig. 1 in its relation to the antenna system and the rest of a direction finding receiver;

Figure 1:
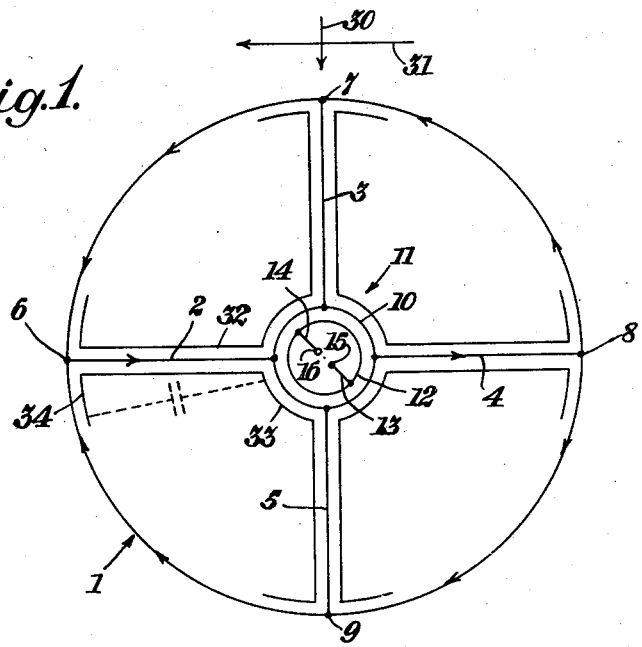
Fig. 1 is a diagrammatic plan view of an antenna system and goniometer embodying our invention.
Figure 2:
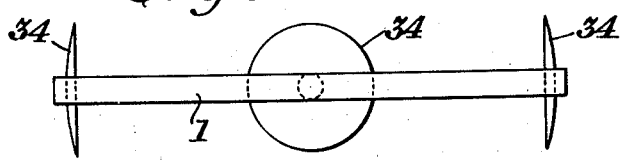
Fig. 2 is an end elevational view of the embodiment of Fig. 1.

Referring now particularly to the direction finder illustrated in Figs. 1-3, the antenna system includes a band of conductive material, such as copper, which is formed in the shape of a single completely closed loop 1 which, in use, will extend substantially in a horizontal plane. The diameter of the loop is preferably less than 90° at the mean frequency at which said system is designed to operate. Four horizontal linear conductors 2-5, have their outer ends connected to loop 1 at four symmetrical and equally spaced points 6-9 respectively thereon and extend from said points radially inward toward the geometrical center of the loop 1 where they are connected to a goniometer, as for example to equally spaced points on the circular stator 10 of a goniometer 11 of the type described in our copending application, F. O. Chesus-F. G. Thomas for "Goniometers," Serial No. 601,800, filed June 27, 1945, now Patent No. 2,457,127 issued December 28, 1948.

Referring now to Fig. 3, the stator is preferably made in the form of a horizontal closed circular trough of conductive material within which a horizontal hollow closed, conductive ring 12, which is the rotor, rotates. The stator and rotor are coaxial, the rotor being adapted to rotate in a horizontal plane about the central vertical axis. Two horizontal conductors 13 and 14 are connected to opposite sides of the rotor 12 and extend radially inwards in line with each other. These conductors 13 and 14 are connected by means of vertical conductors 15 and 16 and by two horizontal radial conductors 17 and 18 to the ends 19 and 20 respectively of a split metallic ring 21 which also rotates with rotor 12. Ring 21 rotates within a circular conductive trough 22 which is stationary, trough 22 being provided with a narrow gap 23, the ends 24 and 25 of the trough 22, adjacent gap 23, being connected by leads 26 and 27 respectively to a direction finding receiver 28 which in turn has at its output an indicator 29.

According to our present understanding of the theory of operation of this system, assuming a wave approaching the system in the direction indicated by arrow 30 (Fig. 1) and having an instantaneous vector electric field such as indicated by arrow 31, currents will be induced in loop 1 as indicated by the arrows around said loop. Accordingly current will tend to flow from conductor 2 to conductor 4. This will cause current to flow through the stator 10 of goniometer 11 and produce such a field that when conductors 13 and 14 are aligned with conductors 2 and 4, a maximum transfer of energy will occur between the stator and the output of rotor 12. However, when conductors 13 and 14 are aligned with conductors 3 and 5 under these conditions a minimum transfer of energy will occur between the stator and the output of rotor 12. If the oncoming wave is at right angles to the direction indicated by arrow 30 with the field at right angles to the field indicated by the arrow 31, then when conductors 13 and 14 are aligned with conductors 3 and 5 a maximum transfer of energy will occur between the stator and the output of rotor 12, while if the conductors 13 and 14 are aligned with conductors 2 and 4 under such conditions a minimum transfer of energy will occur between the stator and rotor. Consequently it will be seen that by rotating the rotor 12, the azimuth is scanned for direction finding purposes. The effective reception diagram provided by the structure described is in the form of a crossed figure-of-eight. It will also be apparent that outside of the stator 10 and rotor 12, the rest of the goniometer primarily serves to couple the rotating conductors 13 and 14 to the stationary lines 26 and 27.

If left unshielded, conductors 2 and 4, and 3 and 5 may act as a dipole pick-up if the antenna is used at a short enough wavelength so that the lengths of these conductors are sufficiently long for this purpose. This dipole energy so picked up will be in the same pattern as that of the loops so that direction finding qualities will not be impaired. At longer wavelengths, however, where these conductors are relatively short, it is preferred to provide a shielding means, such as in the form of coaxial cylindrical or tubular members 32, each surrounding almost the entire length of each of said conductors, which members 32 are connected to a shielding casing 33 toward the center of the loop, the casing 33 surrounding the goniometer 11. To prevent distortion of the reception pattern by shielding members 32, the outer end of each of said members is surrounded by and connected to a separate one of four conductive circular end plates 34 each of which extends in a plane substantially transverse to the member 32 on which it is arranged. According to our present understanding of the theory of the effect of said end plates, the shield members 32 have a substantial inductance introducing a reactance and causing a voltage to appear across each of said shield members 32 resulting in a field which interferes with the proper reception diagram. Each plate 34 forms a substantial capacitance with the opposite end of member 32 on which it is mounted, so as to act as an effective high frequency short, thereby preventing the establishment of voltages across members 32 which would produce interfering fields. A substantial capacity between said plates 34 and the portion of the loop 1 thereadjacent also is produced.

Figure 4:
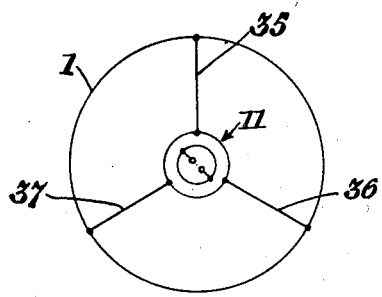
Fig. 4 is a schematic plan view of another embodiment of our invention.

In the embodiment illustrated in Figs. 1–3, the four conductors 2–5 are connected to equally spaced points on loop 1, and connected at their other ends to different parts of the load, and a crossed figure-of-eight directional pattern is obtained. By varying the number of such conductors, different patterns may be obtained. Referring now to Fig. 4, the loop 1 is connected by three conductors 35, 36 and 37 at equally spaced points thereon to the goniometer 11. This will produce a three-lobed pattern instead of a crossed figure-of-eight. Likewise more than four such conductors may be connected to equally spaced points on the loop and produce multi-lobed patterns depending on the number of such conductors.

Figure 5:
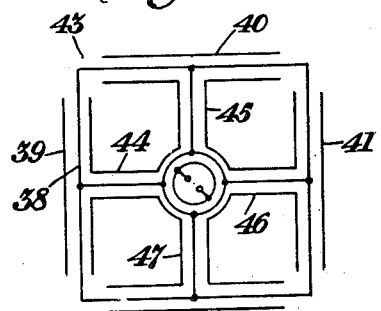
Fig. 5 is a schematic plan view of a third embodiment of our invention.

While in the foregoing figures we have shown the loop 1 to be a round loop, in accordance with our invention, a closed rectangular loop or square loop may be employed. Referring now to Fig. 5, the closed horizontal loop 38 thereof is formed by the inner conductors of four coaxial lines 39—42, the shields 43 of each of said coaxial lines being broken away at the corners of the rectangular figure to expose the inner conductors, the inner conductors being connected together to form a closed loop. Likewise the midpoints of each of said coaxial lines is broken away so as to allow for the connection of the loop, by means of four coaxial lines 44—47 respectively, to the goniometer. The inner conductors of lines 44—47 are connected to equally spaced points on the stator of the goniometer as described in connection with the preceding embodiments. In the embodiment of Fig. 5, no end plate such as plates 34 of Fig. 1 are required. The embodiment of Fig. 5 discriminates sharply against downwardly directed waves and thus tends to produce more accurate directional indications less subject to interference from sources such as ionosphere-reflected waves. This is due to the fact that the outer conductors of the coaxial members form four almost-closed loops tending to produce current flows in opposite directions within each of the inner conductors of members 44—47 and thus neutralizing the effects of the downwardly-inclined waves.

While we have described the details of embodiments of our invention, it will be apparent to those versed in the art that numerous changes may be made in said details without departing from the teachings of our invention. For example, while we have described a specific kind of goniometer for use with the antenna system of our invention, it will be apparent to those versed in the art that conventional goniometers may also be employed therewith. For example, referring to the embodiment of Fig. 1, conductors 2 and 4 may be connected to one coil of a conventional goniometer with conductors 3 and 5 connected to another coil of a conventional goniometer and the rotor 12 replaced by the customary rotor of such goniometers. On the other hand, it will be apparent that capacitive goniometers or electronic goniometers may also be employed in place of that illustrated. Furthermore it is to be understood that for certain purposes it may be desirable to connect the antenna at symmetrical but not equally spaced points thereon to a goniometer, and for other purposes these points may not even be symmetrically positioned. Various other changes will readily occur to those versed in the art. Accordingly, while we have described above the principles of our invention in connection with specific apparatus, and particular modifications thereof, it is to be clearly understood that this description is made only by way of example and not as a limitation on the scope of our invention as defined in the accompanying claims.

We claim:

1. An antenna system for producing a crossed figure-of-eight radiant action pattern comprising a single closed loop of conductive material, four linear conductors extending radially inwards toward the geometrical center of the loop and each connected at their outer ends to equally spaced points on said loop, a load circuit, and means for coupling each of said conductors at their inner ends to separate spaced points of said load circuit.

2. An antenna system for horizontally polarized waves adapted to produce a crossed figure-of-eight radiant action pattern comprising a single closed loop of conductive material extending in a substantially horizontal plane, four horizontal linear conductors extending radially inwards toward the geometrical center of the loop and each connected at their outer ends to equally spaced points on said loop, a load circuit, and means for coupling each of said conductors at their inner ends to separate spaced points of said load circuit.

3. An antenna system comprising a single closed loop of conductive material, a plurality of conductors each connected at one of its ends to equally spaced points on said loop, a load circuit, and means for connecting each of said conductors at their other ends to separate spaced points of said load circuit, a plurality of longitudinal metallic members each surrounding substantially the entire length of a separate one of said conductors and serving as a shield therefor, said shields being connected together toward the inner ends thereof, and a plurality of conductive members arranged at the outer ends of said shields adjacent the loop and extending transversely of said shields.

4. An antenna system according to claim 3 wherein said loop is circular and said conductive members at the outer ends of the shields are circular plates adjacent said loop.

5. An antenna system comprising a closed loop of conductive material, a shield surrounding balanced portions of said loop, and a plurality of conductors each connected at one of its ends to equally spaced points on said loop, a load circuit, and means for connecting each of said conductors at their other ends to separate spaced points of said load circuit.

6. An antenna system according to claim 5 wherein said shield is concentric with said loop and said shield surrounds equally spaced equal portions on said loop.

7. An antenna system according to claim 5 wherein said conductors are each surrounded by a concentric shield.

8. An antenna system comprising a coaxial line having its inner conductor forming a closed loop and its outer conductor removed at equally spaced points along said loop to expose said inner conductor, and a plurality of coaxial lines having their inner conductors each connected at one of their ends to said loop intermediate said points, a load circuit, and means for connecting each of said conductors at their other ends to separate spaced points of said load circuit.

9. An antenna system comprising four coaxial lines arranged in the form of a rectangle and having their inner conductors connected together to form a closed loop with the outer conductors removed at the corners of the rectangle to expose said inner conductors, and four other coaxial lines having their inner conductors each connected at one of their ends to said loop at separate points thereon intermediate said corners and extending radially inwards toward the geometrical center of the rectangle, a load circuit, and means for coupling said inner conductors to separate electrically equal spaced points of said load circuit.

10. In combination, an antenna system and radio goniometer, said system comprising a closed loop of conductive material and a plurality of conductors each connected at one of their ends to points on said loop, means for coupling said conductors at their other ends to separate balanced electrical points of said goniometer, said goniometer being located at substantially the geometrical center of said loop.

11. The combination according to claim 10 wherein said conductors are connected to equally spaced points on said loop and extend radially inwards toward the goniometer, said conductors being linear.

12. In combination, an antenna system comprising a closed loop of conductive material, and a plurality of conductors each connected at one of their ends to equally spaced points on said loop and extending radially inwards toward the geometrical center of said loop, and a goniometer located at the geometrical center of said loop comprising an annular conductive stator having the other ends of said conductors connected to equally spaced points thereon and a conductive rotor mounted for rotation adjacent said stator.

13. A direction finder comprising an antenna system including a closed loop of conductive material, and a plurality of conductors each connected at one of their ends to equally spaced points on said loop and extending radially inwards toward the geometrical center of said loop, a goniometer located at the geometrical center of said loop comprising an annular conductive stator having the other ends of said conductors connected to equally spaced points thereon and a conductive rotor mounted for rotation adjacent said stator, a direction finding receiver, and means for coupling said rotor to said direction finder receiver.

14. The combination according to claim 10 wherein said radio goniometer comprises a stator and a rotor and said loop, conductors, and stator all extend within substantially the same plane and said rotor is mounted for rotation within said plane around a common axis.

15. The combination according to claim 10 wherein said radio goniometer comprises a stator and a rotor and said rotor is arranged for rotation within said stator and is concentric therewith.

16. The combination according to claim 10 wherein said radio goniometer comprises a stator and a rotor and said rotor is concentric with said stator and is arranged within said stator and rotates in the same plane in which said stator extends.

17. The combination according to claim 10 wherein said stator is in the form of a trough and said rotor is mounted for rotation within the trough out of contact with said stator.

18. An arrangement according to claim 2, wherein said separate spaced points comprise balanced impedance paths between consecutive points of said load circuit.

19. An arrangement according to claim 9, wherein said load circuit comprises the stator of a radio goniometer.

FRANK O. CHESUS.
FRANK G. THOMAS.

REFERENCES CITED

The following references are of record in the file of this patent:

UNITED STATES PATENTS

| Number | Name | Date |
|---|---|---|
| 1,702,039 | Chireix | Feb. 12, 1929 |
| 2,082,812 | Worrall | June 8, 1937 |
| 2,193,859 | Bushbeck | Mar. 19, 1940 |
| 2,405,123 | Fyler | Aug. 6, 1946 |
| 2,425,585 | Wheeler | Aug. 12, 1947 |